United States Patent
Takano et al.

(10) Patent No.: US 10,555,225 B2
(45) Date of Patent: *Feb. 4, 2020

(54) BASE STATION, USER EQUIPMENT, COMMUNICATION CONTROL METHOD, AND RADIO COMMUNICATION SYSTEM

(71) Applicant: Sony Corporation, Tokyo (JP)

(72) Inventors: Hiroaki Takano, Saitama (JP); Yuichi Morioka, Tokyo (JP); Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,638

(22) Filed: Nov. 8, 2017

(65) Prior Publication Data

US 2018/0070272 A1 Mar. 8, 2018

Related U.S. Application Data

(63) Continuation of application No. 15/087,639, filed on Mar. 31, 2016, which is a continuation of application
(Continued)

(30) Foreign Application Priority Data

Oct. 30, 2009 (JP) ................................. 2009-250476
Feb. 5, 2010 (JP) ................................. 2010-024409

(51) Int. Cl.
*H04W 4/00* (2018.01)
*H04W 36/00* (2009.01)
(Continued)

(52) U.S. Cl.
CPC ....... *H04W 36/0088* (2013.01); *H04W 36/08* (2013.01); *H04W 36/30* (2013.01);
(Continued)

(58) Field of Classification Search
USPC .......................... 370/329, 330, 331, 332, 341
See application file for complete search history.

(56) References Cited

U.S. PATENT DOCUMENTS 6,697,622 B1   2/2004   Ishikawa et al.
2004/0071119 A1   4/2004   Ishikawa et al.
(Continued)

FOREIGN PATENT DOCUMENTS

CN   101541029 A   9/2009
JP   8 228373   9/1996
(Continued)

OTHER PUBLICATIONS

3GPP TSG-RAN WG2 meeting #67 R2-094300, "Measurement considerations for multicarrier operation", Qualcomm Europe, Total 3 pages, (Aug. 24-28, 2009).
(Continued)

*Primary Examiner* — Zewdu A Beyen
(74) *Attorney, Agent, or Firm* — Xsensus, LLP

(57) ABSTRACT

A base station includes a radio communication unit that establishes communication with a mobile communication terminal using a plurality of component carriers. The base station further includes a determination unit that determines a handover factor. The base station also includes a control unit allocates to the mobile communication terminal a measurement time interval for at least one component carrier from the plurality of component carriers according to the handover factor. A channel quality of the at least one component carrier of another base station is measured during the measurement time interval.

14 Claims, 16 Drawing Sheets

Related U.S. Application Data

No. 14/520,948, filed on Oct. 22, 2014, now Pat. No. 9,357,455, which is a continuation of application No. 13/503,037, filed as application No. PCT/JP2010/006238 on Oct. 21, 2010, now Pat. No. 8,897,260.

(51) Int. Cl.
- *H04W 36/30* (2009.01)
- *H04W 36/08* (2009.01)
- *H04W 36/28* (2009.01)
- *H04W 88/08* (2009.01)
- *H04W 36/38* (2009.01)

(52) U.S. Cl.
CPC ............ *H04W 36/28* (2013.01); *H04W 36/38* (2013.01); *H04W 88/08* (2013.01)

(56) References Cited

U.S. PATENT DOCUMENTS

| | | | |
|---|---|---|---|
| 2007/0097914 A1 | 5/2007 | Grilli | |
| 2008/0189970 A1* | 8/2008 | Wang | H04W 36/0055 33/701 |
| 2009/0270103 A1 | 10/2009 | Pani et al. | |
| 2010/0074130 A1 | 3/2010 | Bertrand | |
| 2010/0087152 A1* | 4/2010 | Mourad | H04B 17/0085 455/67.11 |
| 2010/0303039 A1 | 12/2010 | Zhang et al. | |
| 2010/0322185 A1 | 12/2010 | Park et al. | |
| 2011/0021154 A1 | 1/2011 | Marinier et al. | |
| 2012/0230217 A1 | 9/2012 | Sawai et al. | |
| 2012/0236830 A1 | 9/2012 | Takano et al. | |
| 2012/0243510 A1 | 9/2012 | Takano et al. | |

FOREIGN PATENT DOCUMENTS

| | | |
|---|---|---|
| JP | 2000 175244 | 6/2000 |
| JP | 2001 86545 | 3/2001 |
| JP | 2009 232293 | 10/2009 |
| JP | 2010-516185 A | 5/2010 |
| JP | 2011-19074 A | 1/2011 |
| KR | 10-2009-0099086 | 9/2009 |
| WO | 2001 189970 | 7/2001 |
| WO | 2008 085952 | 7/2008 |
| WO | WO 2008/096436 A1 | 8/2008 |
| WO | WO 2010/109764 A1 | 9/2010 |

OTHER PUBLICATIONS

International Search Report dated Dec. 7, 2010 in PCT/JP10/06238 filed Oct. 21, 2010.

Office Action dated Oct. 1, 2013, in Japanese Patent Application No. 2010-024409.

Combined Chinese Office Action and Search Report dated Mar. 31, 2014, in Chinese Patent Application No. 201080055059.0 with English-language translation.

Office Action dated Jul. 1, 2014 in Japanese Patent Application No. 2013-261183 (with computer-generated English Translation).

Office Action dated Mar. 8, 2016, in Korea Patent Application No. 10-2012-7010269, 9 pgs., (with English language translation).

Extended European Search Report dated Aug. 3, 2015 in Patent Application No. 10826301.3.

3GGP TSG RAN WG2 meeting #67 R2-094731, "Intra LTE-A UE Handover Procedure inter-eNB for CA", Huawei, XP008157474, 5 pgs., (Aug. 24-28, 2009).

Office Action dated Mar. 7, 2017, in European Patent Application No. 10 826 301.3-1857.

Nokia Corporation et al: "Discussion on various Idle Mode open items", 3GPP Draft; R2-080175 E-UTRA Reselection Considerations_V3, 3rd Generation Partnership Project (3GPP), Mobile Competence Centre; 650, Route Des Lucioles, F-06921 Sophia-Antipolis Cedex; France, vol. RAN WG2, No. Sevilla, Spain; Jan. 8, 2008, Jan. 8, 2008 (Jan. 8, 2008), XP050138054, [retrieved on Jan. 8, 2008].

3GPP TSG-RAN2 meeting #67 R2-094966, "Measurement configuration structure for carrier aggregation", LG Electronics Inc., 4 pgs., (Aug. 24-28, 2009).

Combined Office Action and Search Report dated Jan. 23, 2018 in Chinese Patent application No. 201510457899.4 (with English language translation).

\* cited by examiner

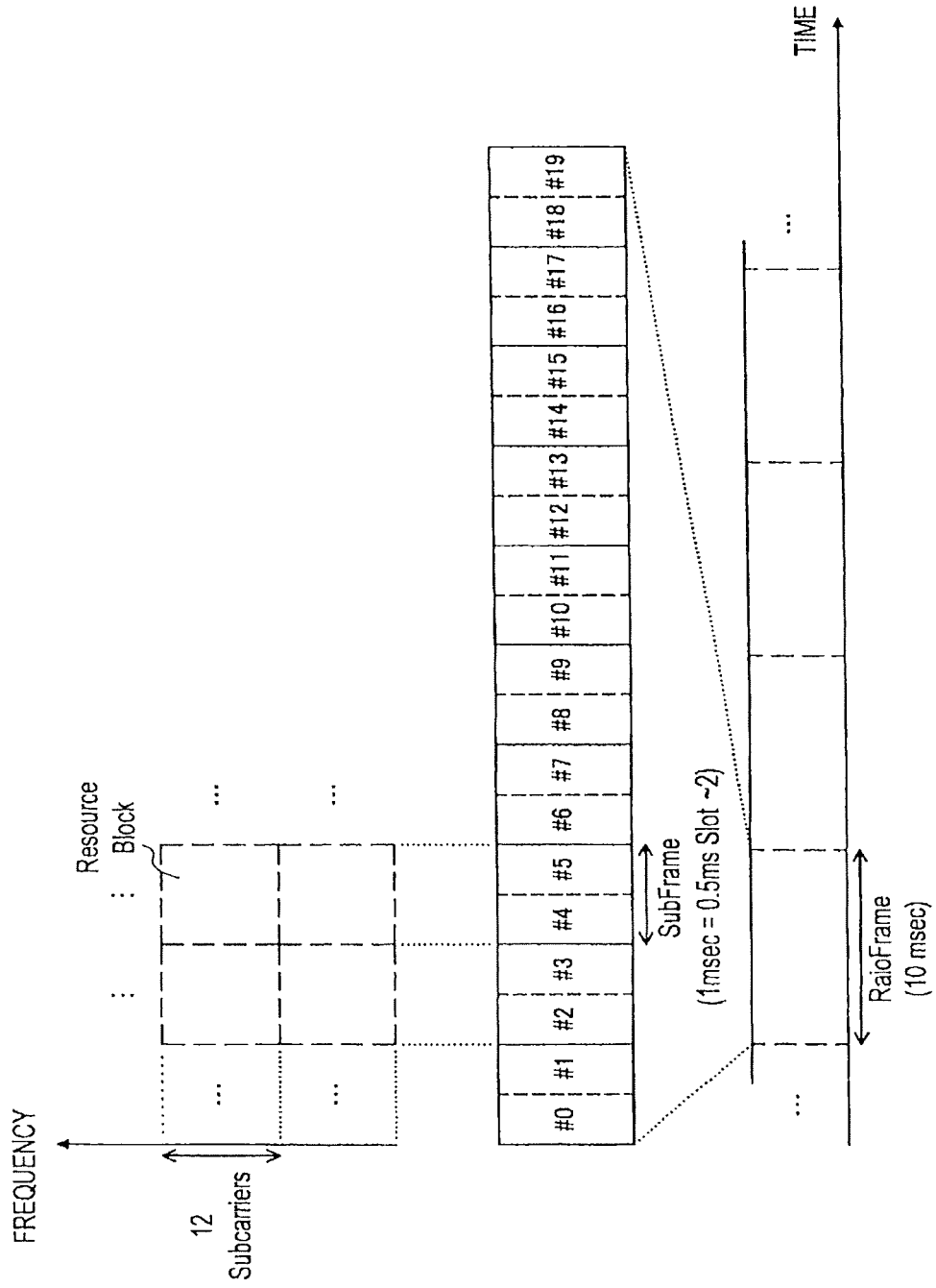

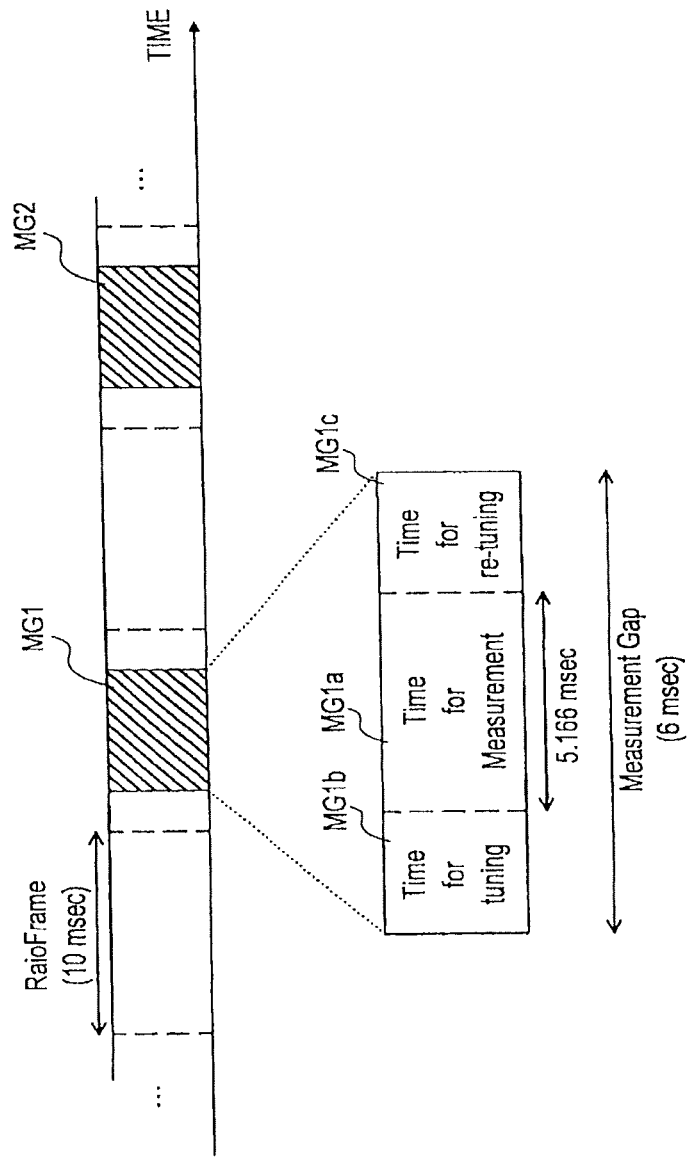

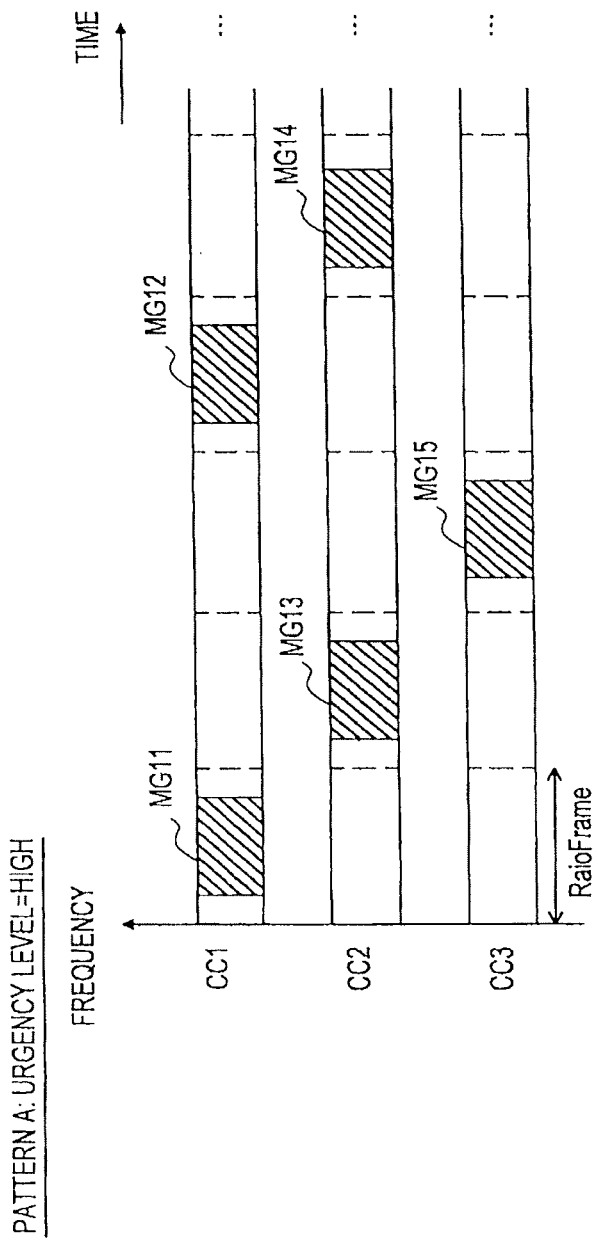

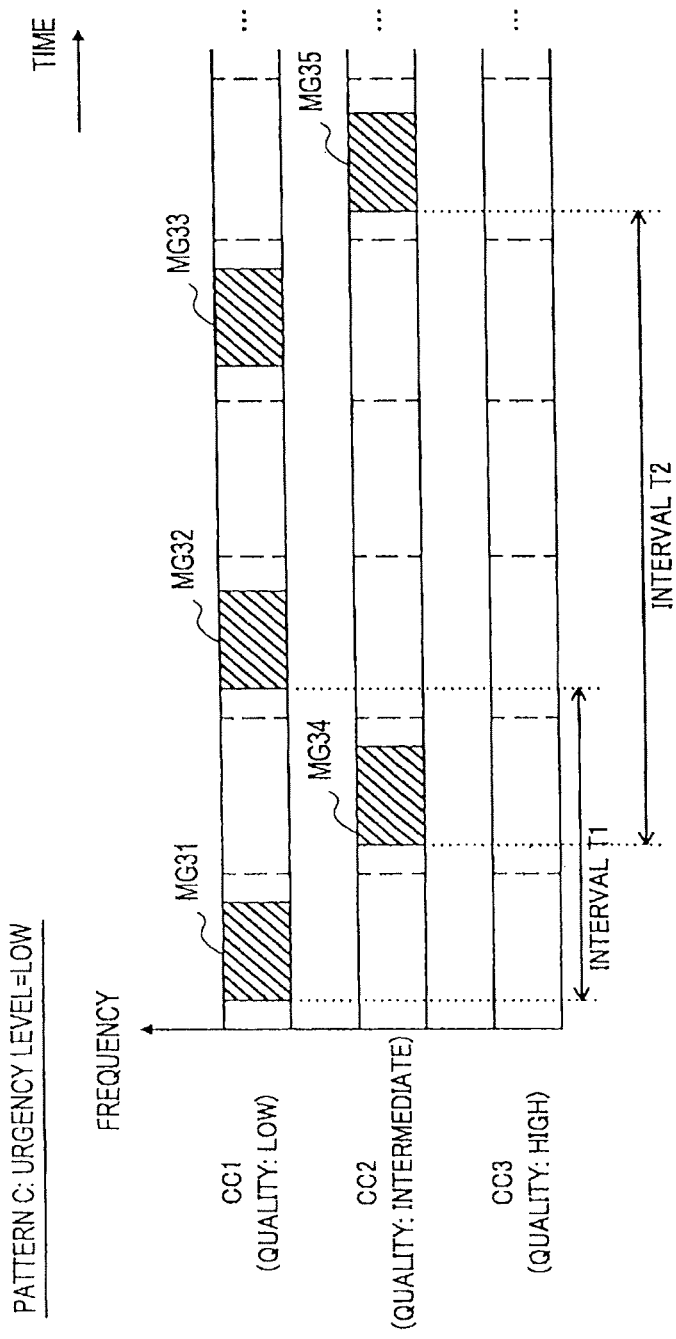

BASE STATION, USER EQUIPMENT, COMMUNICATION CONTROL METHOD, AND RADIO COMMUNICATION SYSTEM

CROSS-REFERENCE TO RELATED APPLICATIONS

This application is a continuation application of, and claims the benefit of priority under 35 U.S.C. § 120 from, U.S. application Ser. No. 15/087,639, filed Mar. 31, 2016, which is a continuation of U.S. Pat. No. 9,357,455, issued May 31, 2016, which is a continuation of U.S. Pat. No. 8,897,260, issued Nov. 25, 2014, which claims the benefit of priority under 35 U.S.C. § 119 from Japanese Patent Applications Nos. 2009-250476 filed Oct. 30, 2009 and 2010-024409 filed on Feb. 5, 2010. The entire contents of each of the above applications are incorporated herein by reference.

TECHNICAL FIELD

The present invention relates to a base station, a user equipment, a communication control method, and a radio communication system.

BACKGROUND ART

In Long Term Evolution-Advanced (LTE-A), which is the next-generation cellular communication standard that is discussed in Third Generation Partnership Project (3GPP), introduction of technology called carrier aggregation (CA) has been studied. The carrier aggregation is technology that forms a communication channel between a user equipment (UE) and a base station (BS, or evolved Node B (eNB)) by aggregating a plurality of frequency bands that are supported in LTE, for example, and thereby improves communication throughput. Each frequency band included in one communication channel by the carrier aggregation is called a component carrier (CC). The bandwidths of frequency bands that are available in LTE are 1.4 MHz, 3.0 MHz, 5.0 MHz, 10 MHz, 15 MHz, and 20 MHz. Accordingly, if five bands of 20 MHz are aggregated as component carriers, a communication channel of 100 MHz in total can be formed.

Component carriers that are included in one communication channel in the carrier aggregation are not necessarily contiguous to one another in the frequency direction. The mode in which component carriers are arranged contiguous to one another in the frequency direction is called a contiguous mode. On the other hand, the mode in which component carriers are arranged not contiguous to one another is called a non-contiguous mode.

Further, in the carrier aggregation, the number of component carriers in an uplink and the number of component carriers in a downlink are not necessarily equal. The mode in which the number of component carriers in an uplink and the number of component carriers in a downlink are equal is called a symmetric mode. On the other hand, the mode in which the number of component carriers in an uplink and the number of component carriers in a downlink are not equal is called an asymmetric mode. For example, in the case of using two component carriers in an uplink and three component carriers in a downlink, it is asymmetric carrier aggregation.

Further, in LTE, any one of frequency division duplex (FDD) and time division duplex (TDD) can be used as duplex operation. Because the direction of a link (uplink or downlink) of each component carrier does not change in time in FDD, FDD is better suited to the carrier aggregation compared to TDD.

Meanwhile, a handover, which is a basic technique for achieving the mobility of a user equipment in the cellular communication standard, is one of important subjects in LTE-A. In LTE, a user equipment measures a communication quality over a channel with a serving base station (a currently connected base station) and communication qualities with peripheral base stations and transmits a measurement report containing measurements to the serving base station. Receiving the measurement report, the serving base station determines whether to execute a handover based on the measurements contained in the report. Then, if it is determined that a handover is to be executed, a handover is carried out among a source base station (the serving base station before a handover), the user equipment, and a target base station (a serving base station after a handover) in accordance with a prescribed procedure (e.g. cf. Patent Literature 1 below)

CITATION LIST

Patent Literature

[PTL 1]
Japanese Unexamined Patent Application Publication No. 2009-232293

SUMMARY OF INVENTION

Technical Problem

However, no case has been reported where active consideration is given to how to carry out a handover procedure in a radio communication involving the carrier aggregation.

For example, in order to measure the communication quality with a base station, it is generally required for a user equipment to establish synchronization with a downlink channel from the base station. A frequency to be synchronized is not necessarily the same as the frequency being used for communication at that point of time. Therefore, the necessity arises in the user equipment to change the operational frequency of a radio communication unit in the physical layer. In order to change the operational frequency, the base station allocates a period called a measurement gap to the user equipment. The base station does not transmit data to the user equipment during the period of the measurement gap, so that the user equipment is allowed to change the operational frequency to perform measurement without any loss of data. However, in the case of involving the carrier aggregation, the number of component carriers that constitute one communication channel is plural. In this case, if measurement gaps are allocated to the respective component carriers in the same manner as it used to, the possibility increases that an increase in measurement gaps causes a decrease in throughput or a delay in handover.

Further, the above issue related to an allocation of measurement gaps can occur not only at the time of a handover but also at the time of a change or an addition of a component carrier in a cell of one base station in a radio communication involving the carrier aggregation. Assume, for example, that further improvement in throughput is desired in the state of performing a radio communication involving the carrier aggregation between a user equipment and a base station. In such a case, throughput may be improved by measuring the communication quality of a frequency band not in use at the point of time and then changing the operational frequency of a component carrier in use to the frequency band with which suitable quality can be obtained or adding a component carrier whose operational frequency is that of the frequency band with which suitable quality can be obtained. In this case also, the necessity arises to allocate measurement gaps to the component carrier in use; however, there is a possibility that an allocation of measurement gaps causes a temporary decrease in throughput or a delay in processing.

In light of the foregoing, it is desirable to provide a novel and improved base station, user equipment, communication control method, and radio communication system that can suppress a decrease in throughput or a delay in processing such as a handover due to an increase in measurement gaps in a radio communication involving the carrier aggregation.

Solution to Problem

According to some embodiments, a base station includes a radio communication unit configured to establish communication with a mobile communication terminal using a plurality of component carriers. The base station further includes a determination unit configured to determine a handover factor. The base station also includes a control unit configured to allocate to the mobile communication terminal a measurement time interval for at least one component carrier from the plurality of component carriers according to the handover factor. Further, a channel quality of the at least one component carrier of another base station is measured during the measurement time interval.

According to some embodiments, a mobile communication terminal includes a radio communication unit configured to establish a communication with a base station using a plurality of component carriers. The mobile communication further includes a control unit configured to receive a measurement time interval for at least one component carrier from a base station according to a handover factor. The mobile communication terminal also includes a measurement unit configured to measure a channel quality of the at least one component carrier of another base station during the measurement time interval.

According to some embodiments, a method includes establishing communication with a mobile communication terminal using a plurality of component carriers. The method further includes determining a handover factor. The method also includes allocating to the mobile communication terminal a measurement time interval for at least one component carrier from the plurality of component carriers according to the handover factor. Further, a channel quality of the at least one component carrier of another base station is measured during the measurement time interval.

According to some embodiments, a non-transitory computer readable medium, having instructions stored thereon, which when executed by a processor in a base station causes the processor to establish communication with a mobile communication terminal using a plurality of component carriers. The instructions further cause the processor to determine a handover factor. The instructions also cause the processor to allocate to the mobile communication terminal a measurement time interval for at least one component carrier from the plurality of component carriers according to the handover factor. Further, a channel quality of the at least one component carrier of another base station is measured during the measurement time interval.

According to some embodiments, a method includes establishing a communication with a base station using a plurality of component carriers. The method further includes receiving a measurement time interval for at least one component carrier from a base station according to a handover factor. The method also includes measuring a channel quality of the at least one component carrier of another base station during the measurement time interval.

According to some embodiments, a non-transitory computer readable medium, having instructions stored thereon, which when executed by a processor in a mobile communication terminal causes the processor to establish a communication with a base station using a plurality of component carriers. The instructions further cause the processor to receive a measurement time interval for at least one component carrier from a base station according to a handover factor. The instructions also cause the processor to measure a channel quality of the at least one component carrier of another base station during the measurement time interval.

According to some embodiments, a base station includes a radio communication unit configured to establish communication with a mobile communication terminal using a plurality of component carriers. The base station further includes a determination unit configured to determine moving speed of the mobile communication terminal or a channel quality of component carrier. The base station also includes a control unit configured to allocate to the mobile communication terminal a measurement time interval for at least one component carrier from the plurality of component carriers according to the moving speed of the mobile communication terminal or the channel quality of component carrier. A channel quality of the at least one component carrier is measured during the measurement time interval.

Advantageous Effects of Invention

As described above, the base station, the user equipment, the communication control method, and the radio communication system according to the embodiments of the present invention can suppress a decrease in throughput or a delay in processing such as a handover due to an increase in measurement gaps in a radio communication involving the carrier aggregation.

BRIEF DESCRIPTION OF DRAWINGS

FIG. 2A is an explanatory view to describe an example of a structure of a communication resource.

FIG. 2B is an explanatory view to describe measurement gaps.

FIG. 11A is an explanatory view to describe a first example of an allocation of measurement gaps.

FIG. 11C is an explanatory view to describe a third example of an allocation of measurement gaps.

DESCRIPTION OF EMBODIMENTS

Figure 1:
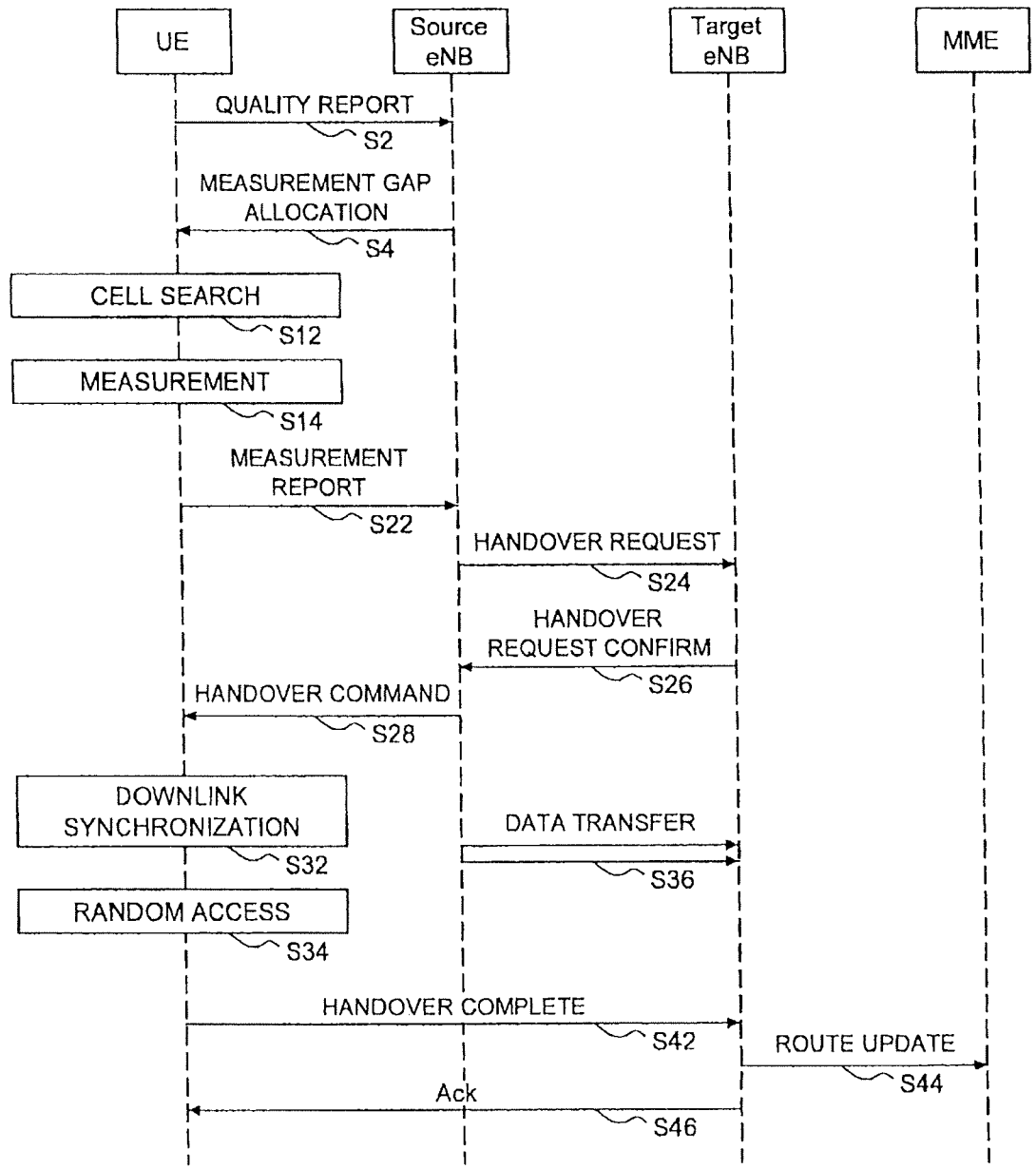
FIG. 1 is a sequence chart to describe a flow of a typical handover procedure.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Description of Related Art
1-1. Handover Procedure
1-2. Measurement Gap
2. Outline of Radio Communication System
2-1. Overview of System
2-2. Issue Related to Carrier Aggregation
3. Exemplary Configuration of Device According to Embodiment
3-1. Exemplary Configuration of User Equipment
3-2. Exemplary Configuration of Base Station
4. Example of Process According to Embodiment
4-1. Flow of Process
4-2. Example of Allocation of Measurement Gaps
4-3. Alternative Example
5. Example of Application to Change or Addition of Component Carrier
6. Summary 1. Description of Related Art 1-1. Handover Procedure A technique related to the present invention is described hereinafter with reference to FIGS. 1, 2A and 2B. FIG. 1 shows a flow of a handover procedure in conformity with LTE in a radio communication not involving the carrier aggregation as an example of a typical handover procedure. In this example, a user equipment (UE), a source base station (source eNB), a target base station (target eNB), and a mobility management entity (MME) are involved in the handover procedure.

As a preliminary step toward a handover, the user equipment first reports the channel quality of a communication channel between the user equipment and the source base station to the source base station (step S2). The channel quality may be reported on a regular basis or when the channel quality falls below a predetermined reference value. The user equipment can measure the channel quality of the communication channel with the source base station by receiving a reference signal contained in a downlink channel from the source base station.

Then, the source base station determines the needs of measurement based on the quality report received from the user equipment and, if measurement is necessary, allocates measurement gaps to the user equipment (step S4). The measurement gap is described in further detail later.

Then, the user equipment searches for a downlink channel from a peripheral base station (i.e. performs cell search) during the periods of the allocated measurement gaps (step S12). Note that the user equipment can recognize a peripheral base station to search according to a list that is provided in advance from the source base station.

When the user equipment acquires synchronization with a downlink channel, the user equipment performs measurement by using a reference signal contained in the downlink channel (step S14). During this period, the source base station restricts an allocation of data communication related to the user equipment so as to avoid occurrence of data transmission by the user equipment.

Upon completion of the measurement, the user equipment transmits a measurement report containing measurements to the source base station (step S22). The measurements contained in the measurement report may be the average value or the central value of measured values over a plurality of times of measurement or the like. Further, the measurements may contain data about a plurality of frequency bands.

Receiving the measurement report, the source base station determines whether or not to execute a handover based on the contents of the measurement report. For example, when the channel quality of another base station in the periphery is higher than the channel quality of the source base station by a predetermined threshold or greater, it can be determined that a handover is necessary. In this case, the source base station determines to carry out a handover procedure with the relevant another base station as a target base station, and transmits a handover request to the target base station (step S24).

Receiving the handover request, the target base station determines whether it is possible to accept the user equipment according to the availability of a communication service offered by itself or the like. When it is possible to accept the user equipment, the target base station transmits a handover request confirm to the source base station (step S26).

Receiving the handover request confirm, the source base station transmits a handover command to the user equipment (step S28). Then, the user equipment acquires synchronization with the downlink channel of the target base station (S32). After that, the user equipment makes random access to the target base station by using a random access channel in a given time slot (step S34). During this period, the source base station forwards data addressed to the user equipment to the target base station (step S36). Then, after succeeded in the random access, the user equipment transmits a handover complete to the target base station (step S42).

Receiving the handover complete, the target base station requests the MME to perform route update for the user equipment (step S44). Upon updating the route of user data by the MME, the user equipment becomes able to communicate with another device through a new base station (i.e. the target base station). Then, the target base station transmits acknowledgement to the user equipment (step S46). A series of handover procedure thereby ends.

1-2. Measurement Gap

FIG. 2A shows a structure of a communication resource in LTE as an example of a structure of a communication resource to which the present invention is applicable. Referring to FIG. 2A, the communication resource in LTE is segmented in the time direction into radio frames each having a length of 10 msec. One radio frame includes ten sub-frames, and one sub-frame is made up of two 0.5 msec slots. In LTE, the sub-frame is one unit of an allocation of a communication resource to each user equipment in the time direction. Such one unit is called a resource block. One resource block includes twelve sub-carriers in the frequency direction. Specifically, one resource block has a size of 1 msec with 12 sub-carriers in the time-frequency domain. Throughput of data communication increases as a larger number of resource blocks are allocated for data communication on condition of the same bandwidth and time length.

FIG. 2B is an explanatory view to describe typical measurement gaps. Referring to FIG. 2B, a measurement gap MG1 is allocated at the position corresponding to the second radio frame from the left in the time direction. Further, a measurement gap MG2 is allocated at the position corresponding to the fourth radio frame from the left in the time direction. Each measurement gap generally has a length of 6 msec. The user equipment can use 5.166 msec at the center for measurement (cf. MG1$a$ in FIG. 2B). The first part of the remaining part of the measurement gap is used for tuning of the operational frequency to the frequency band as a target of measurement by the user equipment (cf. MG1$b$ in FIG. 2B). Further, the latter part of the remaining part of the measurement gap is used for re-tuning of the operational frequency from the frequency band as a target of measurement to the original frequency band by the user equipment (cf. MG1$c$ in FIG. 2B). The interval of the measurement gaps is generally set to be the integral multiple of a radio frame length. Note that, when the frequency band as a target of measurement is the same as the original operational frequency, it is not necessary to allocate measurement gaps. In this case, the user equipment can perform measurement without changing its operational frequency in the physical layer. Such measurement gaps can be allocated to the user equipment in the preliminary step toward a handover procedure as shown in FIG. 1, and they can be further allocated to the user equipment at the time of changing or adding a component carrier.

2. Outline of Radio Communication System

2-1. Overview of System

An outline of a radio communication system to which the present invention is applicable is described hereinafter with reference to FIGS. 3 and 4.

Figure 3:
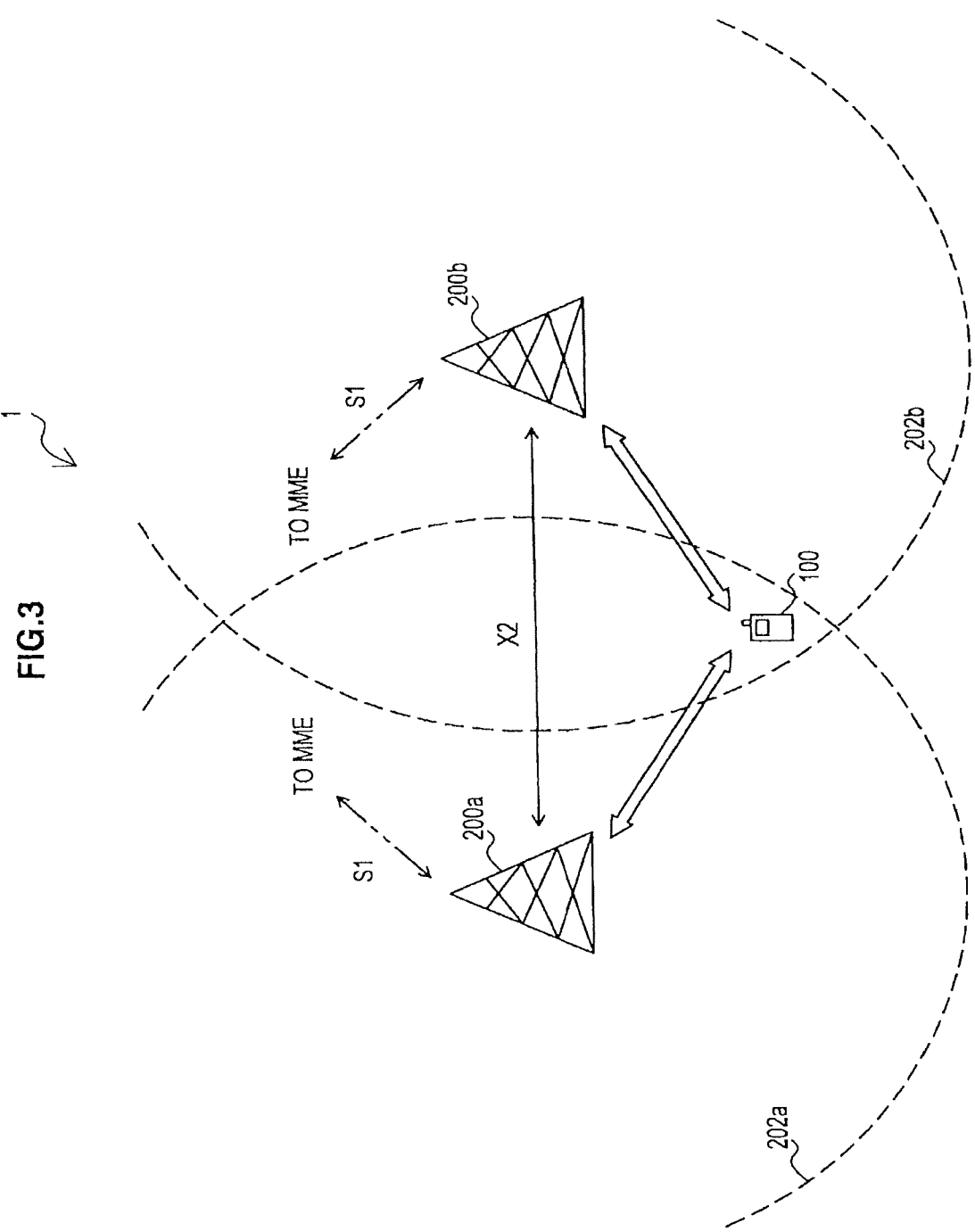
FIG. 3 is a schematic view showing an outline of a radio communication system according to an embodiment.
Figure 4:
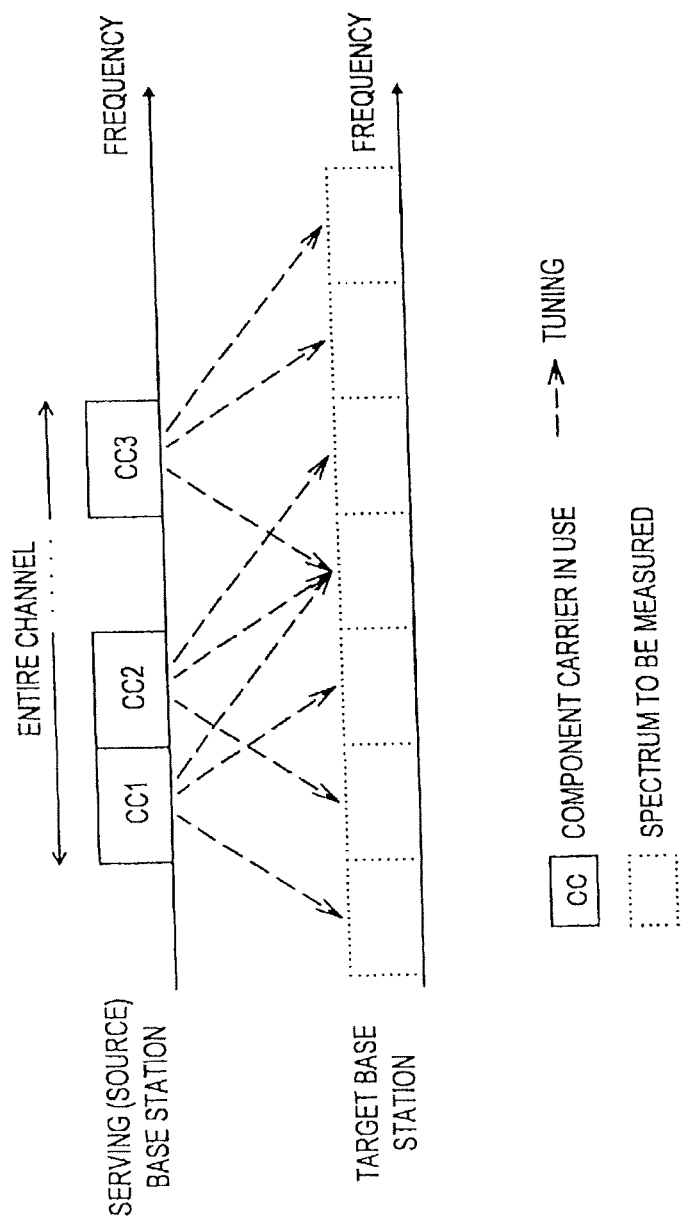
FIG. 4 is an explanatory view to describe an issue related to a measurement gap at the time of carrier aggregation.

FIG. 3 is a schematic view showing an outline of a radio communication system 1 according to an embodiment of the present invention. Referring to FIG. 3, the radio communication system 1 includes a user equipment 100, a base station 200$a$ and a base station 200$b$. It is assumed that the base station 200$a$ is a serving base station for the user equipment 100.

The user equipment 100 is located inside a cell 202$a$ where a radio communication service is provided by the base station 200$a$. The user equipment 100 can perform a data communication with another user equipment (not shown) via the base station 200$a$ over a communication channel formed by aggregating a plurality of component carriers (i.e. by carrier aggregation). However, because the distance between the user equipment 100 and the base station 200$a$ is not short, there is a possibility that a handover is required for the user equipment 100. Further, the user equipment 100 is located inside a cell 202$b$ where a radio communication service is provided by the base station 200$b$. Therefore, the base station 200$b$ can be a candidate for a target base station for a handover of the user equipment 100.

The base station 200$a$ can communicate with the base station 200$b$ through a backhaul link (e.g. X2 interface). Various kinds of messages in the handover procedure as described with reference to FIG. 1, scheduling information related to the user equipment belonging to each cell or the like, for example, can be transmitted and received between the base station 200$a$ and the base station 200$b$. Further, the base station 200$a$ and the base station 200$b$ can communicate with the MME, which is an upper node, through S1 interface, for example.

It should be noted that, when there is no particular need to distinguish between the base station 200$a$ and the base station 200$b$ in the following description of the specification, they are collectively referred to as a base station 200 by omitting the alphabetical letter at the end of the reference symbol. The same applies to the other elements.

2-2. Issue Related to Carrier Aggregation

In the case where the user equipment 100 may perform a carrier aggregation under the circumstance that there is a possibility of a handover as shown in FIG. 3, the issue arises as to how to allocate measurement gaps to a plurality of component carriers constituting a communication channel. FIG. 4 is an explanatory view to describe such an issue related to measurement gaps at the time of the carrier aggregation.

Generally, there are a plurality of candidates for a frequency band after a handover which is to be a target of measurement even in the case of not performing a carrier aggregation. In the case of involving the carrier aggregation, the necessary number of times of measurement increases according to the number of component carriers. In the example of FIG. 4, three component carriers CC1 to CC3 that are partly discretely arranged in the frequency direction constitute a communication channel between the user equipment and the serving base station. Further, the number of candidates for a component carrier after a handover to be a target of measurement involving a change in operational frequency is three for each of the component carriers. In the example of FIG. 4, even when performing measurement once for overlapping candidates, it is necessary to carry out measurement for seven component carriers in the target base station for the overall communication channel. Note that, if the number of component carriers in use is three and the number of candidates for a component carrier after a handover for each of the component carriers is three, 3×3=9 times of measurement at the maximum are necessary when calculated in the most simplified manner.

An increase in the necessary number of times of measurement means that it is necessary to allocate a larger number of measurement gaps for changing the operational frequency at the time of measurement (which can include tuning and re-tuning). This leads to a decrease in throughput and a delay in handover associated with the stop of data communication in the middle of a measurement gap. Therefore, in the radio communication system 1 where the carrier aggregation is performed, it is effective to perform an allocation of measurement gaps efficiently by a technique according to an embodiment described in the following sections.

3. Exemplary Configuration of Device According to Embodiment

Examples of configurations of the user equipment 100 and the base station 200 included in the radio communication system 1 according to an embodiment of the present invention are described hereinafter with reference to FIGS. 5 to 8.

3-1. Exemplary Configuration of User Equipment

Figure 5:
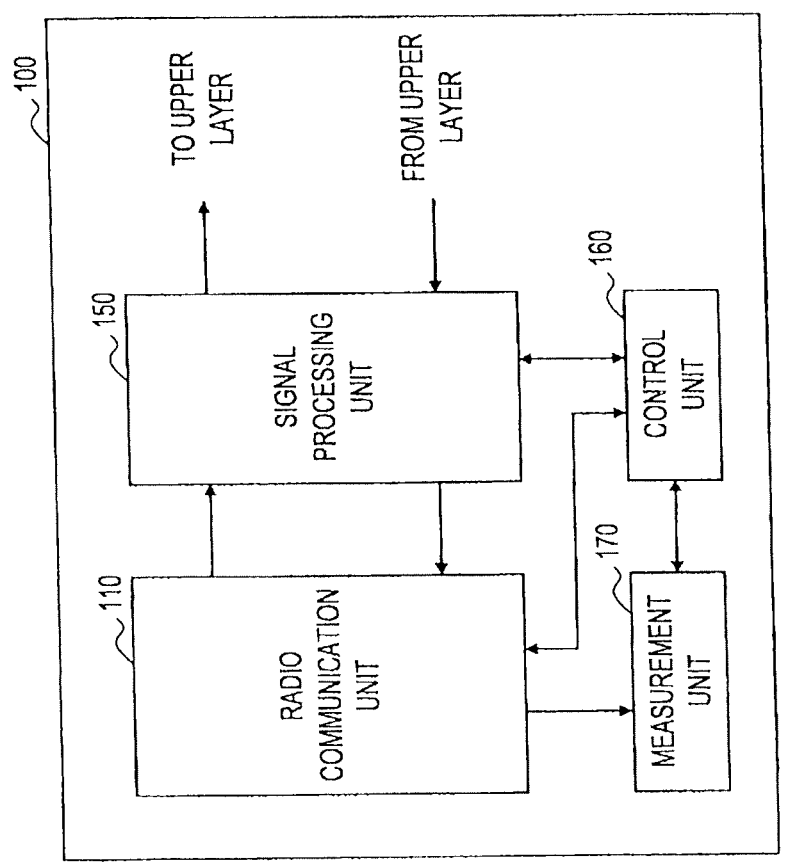
FIG. 5 is a block diagram showing an example of a configuration of a user equipment according to an embodiment.

FIG. 5 is a block diagram showing an example of a configuration of the user equipment 100 according to the embodiment. Referring to FIG. 5, the user equipment 100 includes a radio communication unit 110, a signal processing unit 150, a control unit 160, and a measurement unit 170.
(Radio Communication Unit)

The radio communication unit 110 performs a radio communication with the base station 200 over a communication channel formed by aggregating a plurality of component carriers with use of the carrier aggregation technology.

Figure 6:
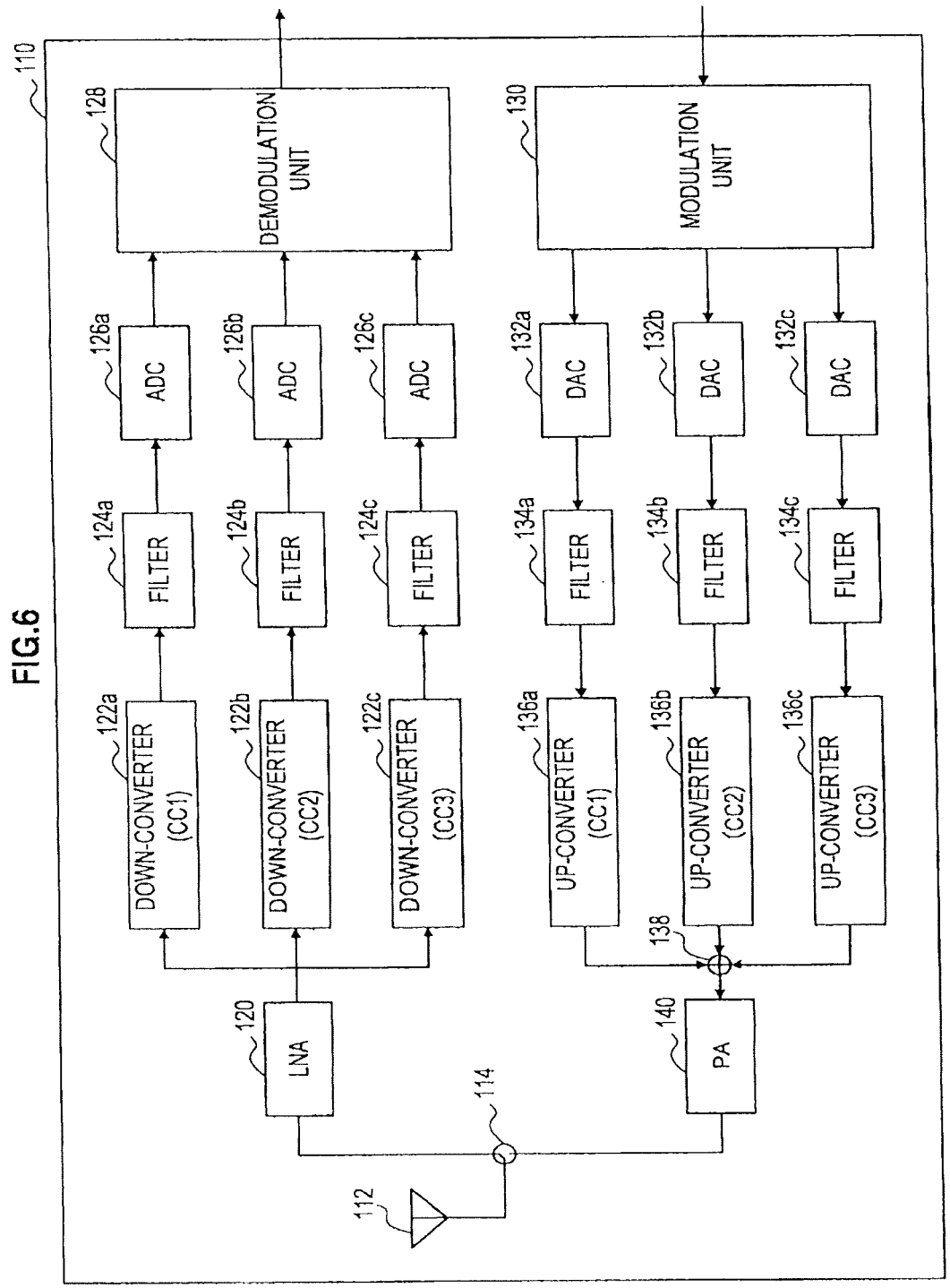
FIG. 6 is a block diagram showing an example of a detailed configuration of a radio communication unit according to an embodiment.

FIG. 6 is a block diagram showing an example of a more detailed configuration of the radio communication unit 110. Referring to FIG. 6, the radio communication unit 110 includes an antenna 112, a switch 114, a low noise amplifier (LNA) 120, a plurality of down-converters 122a to 122c, a plurality of filters 124a to 124c, a plurality of analogue-to-digital converters (ADCs) 126a to 126c, a demodulation unit 128, a modulation unit 130, a plurality of digital-to-analogue converters (DACs) 132a to 132c, a plurality of filters 134a to 134c, a plurality of up-converters 136a to 136c, a combiner 138, and a power amplifier (PA) 140.

The antenna 112 receives a radio signal transmitted from the base station 200 and outputs the received signal to the LNA 120 through the switch 114. The LNA 120 amplifies the received signal. The down-converter 122a and the filter 124a separate a baseband signal of the first component carrier (CC1) from the received signal amplified by the LNA 120. Then, the separated baseband signal is converted to a digital signal by the ADC 126a and output to the demodulation unit 128. Likewise, the down-converter 122b and the filter 124b separate a baseband signal of the second component carrier (CC2) from the received signal amplified by the LNA 120. Then, the separated baseband signal is converted to a digital signal by the ADC 126b and output to the demodulation unit 128. Further, the down-converter 122c and the filter 124c separate a baseband signal of the third component carrier (CC3) from the received signal amplified by the LNA 120. Then, the separated baseband signal is converted to a digital signal by the ADC 126c and output to the demodulation unit 128. After that, the demodulation unit 128 generates a data signal by demodulating the baseband signals of the respective component carriers and outputs the data signal to the signal processing unit 150.

Further, when a data signal is input from the signal processing unit 150, the modulation unit 130 modulates the data signal and generates baseband signals of the respective component carriers. Among those baseband signals, the baseband signal of the first component carrier (CC1) is converted to an analog signal by the DAC 132a. Then, a frequency component corresponding to the first component carrier in a transmission signal is generated from the analog signal by the filter 134a and the up-converter 136a. Likewise, the baseband signal of the second component carrier (CC2) is converted to an analog signal by the DAC 132b. Then, a frequency component corresponding to the second component carrier in the transmission signal is generated from the analog signal by the filter 134b and the up-converter 136b. Further, the baseband signal of the third component carrier (CC3) is converted to an analog signal by the DAC 132c. Then, a frequency component corresponding to the third component carrier in the transmission signal is generated from the analog signal by the filter 134c and the up-converter 136c. After that, the generated frequency components corresponding to the three component carriers are combined by the combiner 138, and the transmission signal is formed. The PA 140 amplifiers the transmission signal and outputs the transmission signal to the antenna 112 through the switch 114. Then, the antenna 112 transmits the transmission signal as a radio signal to the base station 200.

Although the case where the radio communication unit 110 handles three component carriers is described in FIG. 6, the number of component carriers handled by the radio communication unit 110 may be two, or four or more.

Further, instead of processing the signals of the respective component carriers in the analog region as in the example of FIG. 6, the radio communication unit 110 may process the signals of the respective component carriers in the digital region. In the latter case, at the time of reception, a digital signal converted by one ADC is separated into the signals of the respective component carriers by a digital filter. Further, at the time of transmission, after digital signals of the respective component carriers are frequency-converted and combined, the signal is converted into an analog signal by one DAC. The load of the ADC and the DAC is generally smaller when processing the signals of the respective component carriers in the analog region. On the other hand, when processing the signals of the respective component carriers in the digital region, a sampling frequency for AD/DA conversion is higher, and the load of the ADC and the DAC can thereby increase.
(Signal Processing Unit)

Referring back to FIG. 5, an example of a configuration of the user equipment 100 is further described below.

The signal processing unit 150 performs signal processing such as deinterleaving, decoding or error correction on the demodulated data signal that is input from the radio communication unit 110. Then, the signal processing unit 150 outputs the processed data signal to an upper layer. Further, the signal processing unit 150 performs signal processing such as encoding or interleaving on the data signal that is input from the upper layer. Then, the signal processing unit 150 outputs the processed data signal to the radio communication unit 110.
(Control Unit)

The control unit 160 controls the overall functions of the user equipment 100 by using a processing device such as a central processing unit (CPU) or a digital signal processor (DSP). For example, the control unit 160 controls the timing of data communication by the radio communication unit 110 according to scheduling information that is received from the base station 200 by the radio communication unit 110. Further, the control unit 160 controls the measurement unit 170 to measure the channel quality by using a reference signal from the base station 200, which is a serving base station, and transmits the channel quality report to the base station 200 through the radio communication unit 110. Further, in this embodiment, when measurement gaps are allocated to the user equipment 100 by the base station 200, the control unit 160 controls the measurement unit 170 to execute measurement during the periods of the allocated measurement gaps.

(Measurement Unit)

The measurement unit 170 measures the channel quality for each of the component carriers by using a reference signal from the base station 200 according to control from the control unit 160, for example. Further, when measurement gaps are allocated to the user equipment 100 by the base station 200, the measurement unit 170 executes measurement for a handover by using the allocated measurement gaps.

In this embodiment, measurement gaps are allocated for each of the component carriers by the base station 200 as described later. In light of this, during the period of the measurement gap allocated to the first component carrier, for example, the control unit 160 tunes the operational frequency for the first component carrier (e.g. the operational frequency of the branch of the down-converter 122a, the filter 124a and the ADC 126a shown in FIG. 6) of the radio communication unit 110 to a given frequency band as a target of measurement. Next, the measurement unit 170 performs measurement for the relevant frequency band. Then, before the period of the measurement gap ends, the control unit 160 re-tunes the operational frequency for the first component carrier of the radio communication unit 110 to the original frequency band. Such measurement is performed in the same manner for the second and third component carriers also.

The measurements for each of the component carriers executed by the measurement unit 170 in the above manner are converted to a predetermined format for a measurement report by the control unit 160 and transmitted to the base station 200 through the radio communication unit 110. After that, the base station 200 determines, based on the measurement report, whether to execute a handover for the user equipment 100.

3-2. Exemplary Configuration of Base Station

Figure 7:
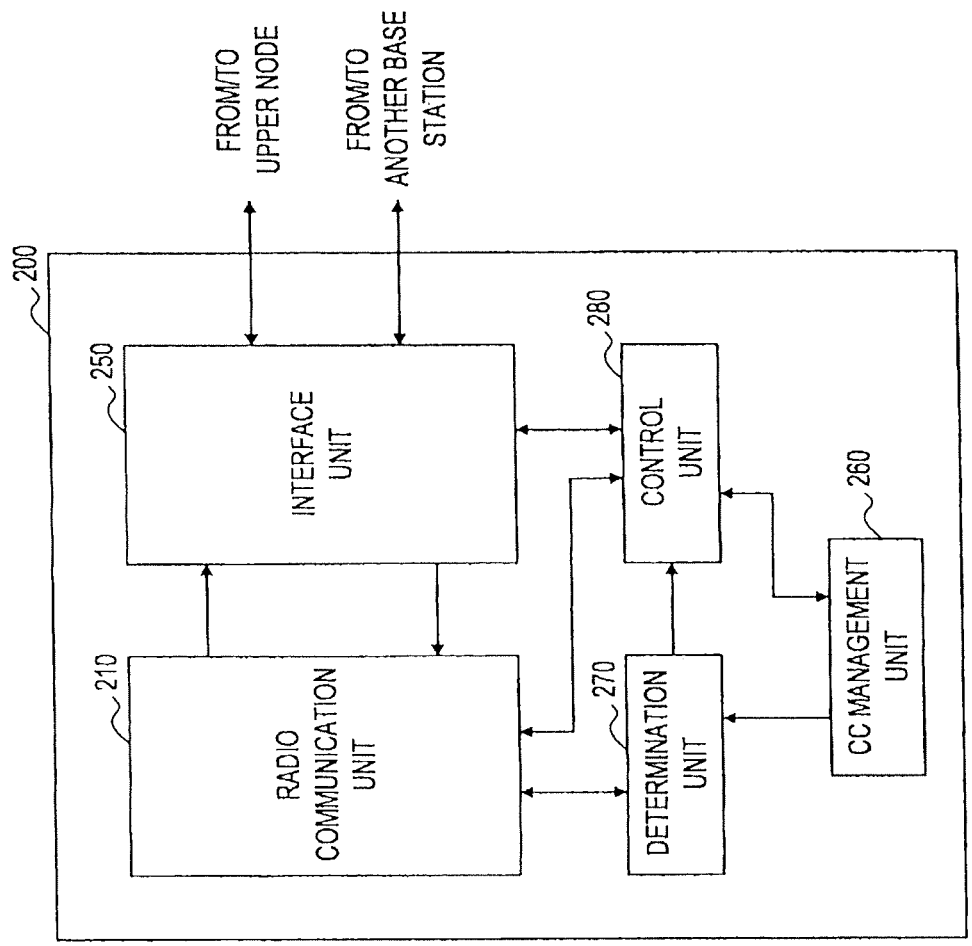
FIG. 7 is a block diagram showing an example of a configuration of a base station according to an embodiment.

FIG. 7 is a block diagram showing an example of a configuration of the base station 200 according to the embodiment. Referring to FIG. 7, the base station 200 includes a radio communication unit 210, an interface unit 250, a component carrier (CC) management unit 260, a determination unit 270, and a control unit 280.

(Radio Communication Unit)

A specific configuration of the radio communication unit 210 may be similar to the configuration of the radio communication unit 110 of the user equipment 100 which is described above with reference to FIG. 6, although the number of component carriers to be supported, the requirements of processing performance or the like are different. The radio communication unit 210 performs a radio communication with the user equipment over a communication channel formed by aggregating a plurality of component carriers with use of the carrier aggregation technology.

(Interface Unit)

The interface unit 250 mediates a communication between the radio communication unit 210 or the control unit 280 and an upper node through the S1 interface illustrated in FIG. 3, for example. Further, the interface unit 250 mediates a communication between the radio communication unit 210 or the control unit 280 and another base station through the X2 interface illustrated in FIG. 3, for example.

(CC Management Unit)

The CC management unit 260 holds data that indicates which component carrier each user equipment is using for communication with respect to each of the user equipments belonging to the cell of the base station 200. Such data can be updated by the control unit 280 when an additional user equipment joins the cell of the base station 200 or when the existing user equipment changes its component carriers. Thus, the determination unit 270 and the control unit 280, for example, can recognize which component carrier the user equipment 100 is using by referring to the data held by the CC management unit 260.

(Determination Unit)

The determination unit 270 determines the urgency level of a handover of the user equipment based on a received signal that is received from the user equipment by the radio communication unit 210. Specifically, the determination unit 270 may determine that the urgency level of a handover of the user equipment is higher as the moving speed of the user equipment which is detected based on the received signal received from the user equipment is higher. Further, the determination unit 270 may determine that the urgency level of a handover of the user equipment is higher as the channel quality contained in the received signal received from the user equipment is lower.

Figure 8:
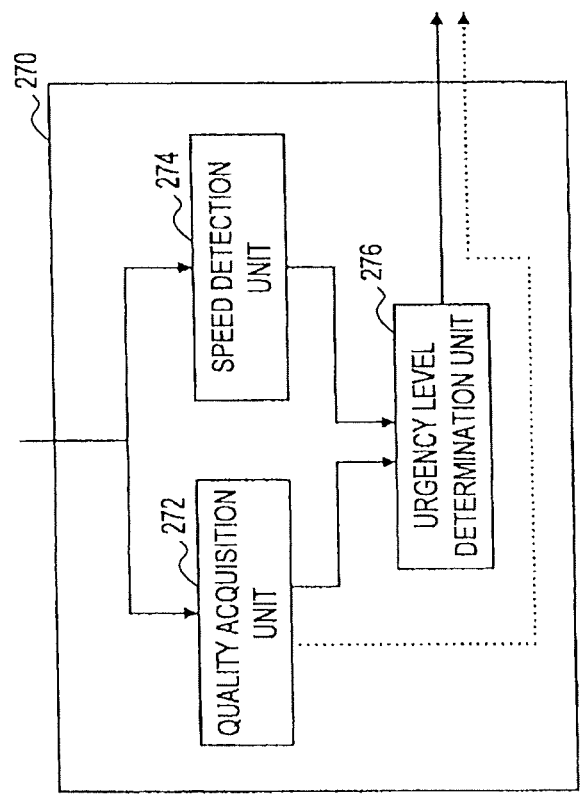
FIG. 8 is a block diagram showing an example of a detailed configuration of a determination unit according to an embodiment.

FIG. 8 is a block diagram showing an example of a more detailed configuration of the determination unit 270. Referring to FIG. 8, the determination unit 270 includes a quality acquisition unit 272, a speed detection unit 274, and an urgency level determination unit 276.

The quality acquisition unit 272 acquires the quality level of a communication channel between the user equipment and the base station 200 for each of the component carriers based on the received signal from the user equipment. For example, the quality acquisition unit 272 may acquire the quality levels of the respective component carriers by receiving the channel quality report transmitted from the user equipment. Further, the quality acquisition unit 272 may acquire the quality levels of the respective component carriers by measuring a parameter such as a received signal intensity or an error rate of the received signal from the user equipment. The quality acquisition unit 272 outputs the quality levels of the respective component carriers acquired in this manner to the urgency level determination unit 276.

The speed detection unit 274 detects the moving speed of the user equipment based on the received signal received from the user equipment. For example, in the case where the user equipment has a global positioning system (GPS) function, position data indicating the position of the user equipment measured by the GPS function is contained in the received signal. In this case, the speed detection unit 274 can detect the moving speed of the user equipment by acquiring the position data from the received signal and then calculating a change over time of the position of the user equipment by using the acquired position data. Further, the moving speed may be calculated in the user equipment from the position measured by the GPS function. In this case, the speed detection unit 274 can be informed of the moving speed from the user equipment. Further, the speed detection unit 274 may detect the moving speed of the user equipment from a measurement result about the received signal from the user equipment, such as a change in the signal delay of the received signal, for example. Further, the speed detection unit 274 may measure the position of the user equipment by using known positioning technology based on a radio signal and calculate the moving speed of the user equipment. The speed detection unit 274 outputs the moving speed of the user equipment detected in this manner to the urgency level determination unit 276.

Figure 9:
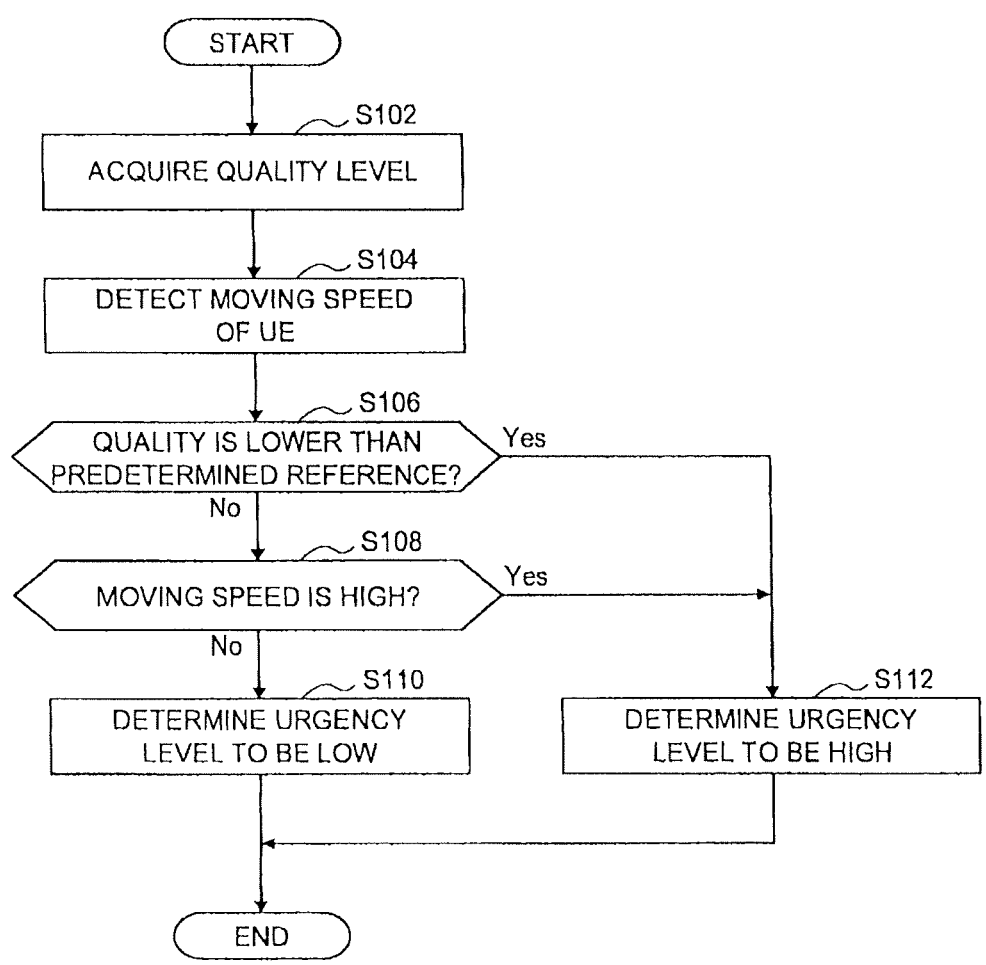
FIG. 9 is a flowchart showing an example of a flow of an urgency level determination process according to an embodiment.

The urgency level determination unit 276 determines the urgency level of a handover of the user equipment based on the channel quality level input from the quality acquisition unit 272 and the moving speed of the user equipment input from the speed detection unit 274. FIG. 9 is a flowchart showing an example of a flow of an urgency level determination process by the determination unit 270 according to the embodiment.

According to some embodiments, a handover factor specifies an urgency level for handover to the another base station. According to further embodiments the urgency level depends on a moving speed of the mobile communication terminal or a communication quality of the mobile communication terminal. Further, according to some embodiments, the urgency level is low upon determination that the moving speed of the mobile communication terminal is below a speed threshold and the communication quality is above a communication threshold.

Referring to FIG. 9, the quality acquisition unit 272 first acquires the quality levels of the respective component carriers (step S102). Next, the speed detection unit 274 detects the moving speed of the user equipment (step S104).

Then, the urgency level determination unit 276 determines whether the channel quality is lower than a predetermined reference by using the quality levels of the respective component carriers (step S106). Specifically, for example, the urgency level determination unit 276 compares a parameter such as the average value or the minimum value of the quality levels of the respective component carriers with a predetermined reference value such as a communication threshold. When it is determined that the channel quality is lower than the predetermined reference, the process proceeds to the step S112. On the other hand, when it is determined that the channel quality is not lower than the predetermined reference, the process proceeds to the step S108.

In the step S108, the urgency level determination unit 276 determines whether the moving speed of the user equipment is higher than a predetermined reference value such as a speed threshold (step S108). When it is determined that the moving speed of the user equipment is higher than the predetermined reference, the process proceeds to the step S112. On the other hand, when it is determined that the moving speed of the user equipment is not higher than the predetermined reference, the process proceeds to the step S110.

In the step S110, because the channel quality is not lower than the predetermined reference and the moving speed of the user equipment is not higher than the predetermined reference, the urgency level determination unit 276 determines that the urgency level of a handover of the user equipment is low (step S110). On the other hand, in the step S112, because the channel quality is lower than the predetermined reference and the moving speed of the user equipment is higher than the predetermined reference, the urgency level determination unit 276 determines that the urgency level of a handover of the user equipment is high (step S112).

The urgency level determination unit 276 outputs the urgency level determined in this manner to the control unit 280. Further, the quality acquisition unit 272 outputs the quality levels of the respective component carriers to the control unit 280. Note that the case of determining whether the urgency level of a handover of the user equipment is either "high" or "low" is described in FIG. 9. However, the present invention is not limited thereto, and the urgency level of a handover may be categorized into a larger number of levels. Further, the reference value to be compared with a parameter such as the average value or the minimum value of the quality levels of the respective component carriers in the step S106 of FIG. 9 may vary dynamically, for example. The reference value may vary dynamically based on the number of user equipments connected to the base station, the surrounding electric field environment or the like, for example. This enables a flexible system operation. Likewise, the reference value to be compared with the moving speed of the user equipment in the step S108 may also vary dynamically.

(Control Unit)

The control unit 280 controls the overall functions of the base station 200 by using a processing device such as a CPU or a DSP. Further, in this embodiment, the control unit 280 controls an allocation of measurement gaps for the user equipment with respect to each component carrier according to the urgency level determined as a result of the urgency level determination process by the determination unit 270 described above.

Specifically, the control unit 280 can allocate measurement gaps to a larger number of component carriers as the urgency level of a handover is higher. For example, the case is assumed where the urgency level of a handover is categorized to either "high" or "low" as described with reference to FIG. 9. In this case, when the urgency level of a handover is determined to be high, the control unit 280 allocates measurement gaps to all of the component carriers being used by the user equipment. On the other hand, when the urgency level of a handover is determined to be low, the control unit 280 allocates measurement gaps to some (e.g. any one) of the component carriers being used by the user equipment. Thus, when the urgency level of a handover is low, measurement is performed over a relatively long time to thereby avoid a decrease in throughput, and when the urgency level of a handover is high, measurement is performed in a short time to thereby prevent a delay in handover.

Further, the control unit 280 may vary the pattern of an allocation of measurement gaps depending on the quality levels of the channel quality of the respective component carriers acquired by the quality acquisition unit 272.

Specifically, in the case of allocating measurement gaps to some of the component carriers, for example, the control unit 280 may preferentially allocate measurement gaps to a component carrier with a low quality level. Further, in the case of allocating measurement gaps to two or more component carriers, the control unit 280 may set the interval of measurement gaps allocated to a first component carrier to be longer than the interval of measurement gaps allocated to a second component carrier with a lower quality level. The proportion of a measurement gap to the communication resource is thereby low for the component carrier with a high quality level, and it is thereby possible to suppress a decrease in throughput compared to the case of allocating measurement gaps uniformly to all component carriers regardless of the quality level.

Further, in the case of allocating measurement gaps to two or more component carriers, for example, the control unit 280 may decide an allocation of measurement gaps in such a way that the timing of any measurement gap does not coincide with the timing of another measurement gap. It is thereby possible to avoid a delay in data transmission due to the existence of a time during which data transmission is not performed at all.

Further, in the case where two or more component carriers are contiguous to one another in the frequency direction or where the distance between two or more component carriers in the frequency direction is shorter than a predetermined threshold, for example, the control unit 280 may allocate measurement gaps only to one component carrier of the two or more component carriers. In such a case, the measurements for one component carrier are used for the other component carrier located in contiguous or close proximity in the frequency direction, for example, so that it is possible to shorten a time necessary for measurement and thereby avoid a delay in handover and suppress a decrease in throughput.

Further, in the case where the number of component carriers available for measurement is notified from a user equipment, for example, the control unit 280 may control an allocation of measurement gaps in such a way that the number of component carriers to which measurement gaps are allocated does not exceed the notified number. It is thereby possible to avoid a useless allocation of measurement gaps and suppress a decrease in throughput.

4. Example of Process According to Embodiment

4-1. Flow of Process

Figure 10:
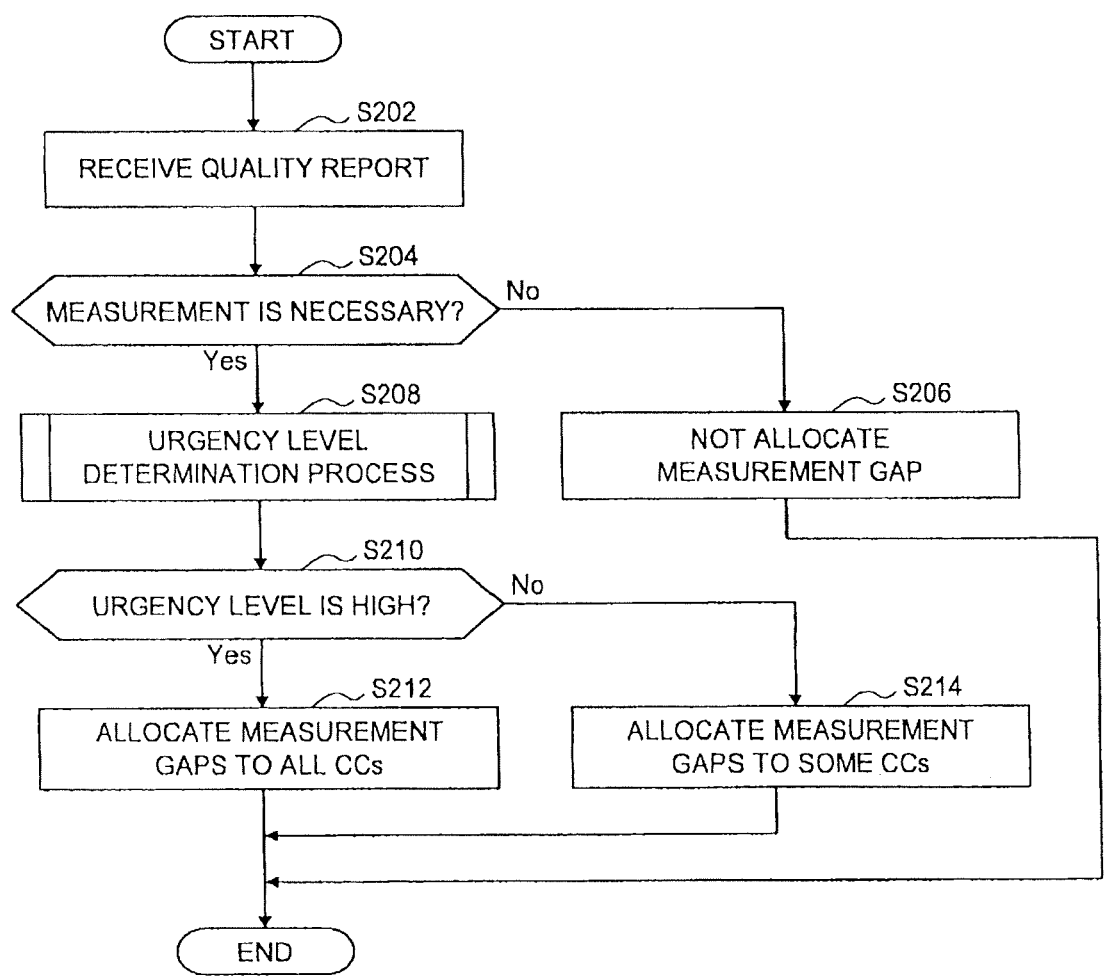
FIG. 10 is a flowchart showing an example of a detailed flow of a measurement gap allocation process according to an embodiment.

FIG. 10 is a flowchart showing an example of a detailed flow of a measurement gap allocation process by the base station 200 according to an embodiment.

Referring to FIG. 10, the radio communication unit 210 first receives the channel quality report from the user equipment (step S202). Then, the radio communication unit 210 outputs the received channel quality report to the control unit 280.

Next, the control unit 280 determines the necessity of measurement for a handover based on the channel quality report (step S204). When it is determined that measurement for a handover is unnecessary for the reason such as suitable channel quality, for example, measurement gaps are not allocated (step S206), and the measurement gap allocation process ends. On the other hand, when it is determined that measurement for a handover is necessary, the process proceeds to the step S208.

In the step S208, the urgency level determination process described above with reference to FIG. 9 is performed by the determination unit 270 (step S208). Then, the determination unit 270 outputs the determined urgency level of a handover to the control unit 280.

Then, the control unit 280 determines whether the urgency level of a handover determined by the determination unit 270 is high or not (step S210). When the urgency level of a handover is high, the process proceeds to the step S212. On the other hand, when the urgency level of a handover is not high, the process proceeds to the step S214.

In the step S212, the control unit 280 allocates measurement gaps to all of the component carriers being used by the user equipment (step S212). On the other hand, in the step S214, the control unit 280 allocates measurement gaps to some of the component carriers being used by the user equipment (step S214). Then, the measurement gap allocation process ends.

4-2. Example of Allocation of Measurement Gaps

According to some embodiments, when a component carrier from the plurality of component carriers has a higher communication quality compared to each other component carrier from the plurality of component carriers, assignment of the measurement gap to the component carrier with the highest communication quality is avoided. In further embodiments a frequency of allocation of the measurement gap is adjusted where the frequency of the measurement time interval is increased if the communication quality of a component carrier degrades, and the frequency of the measurement time interval is decreased if the communication quality of the component carrier improves.

Figure 11B:
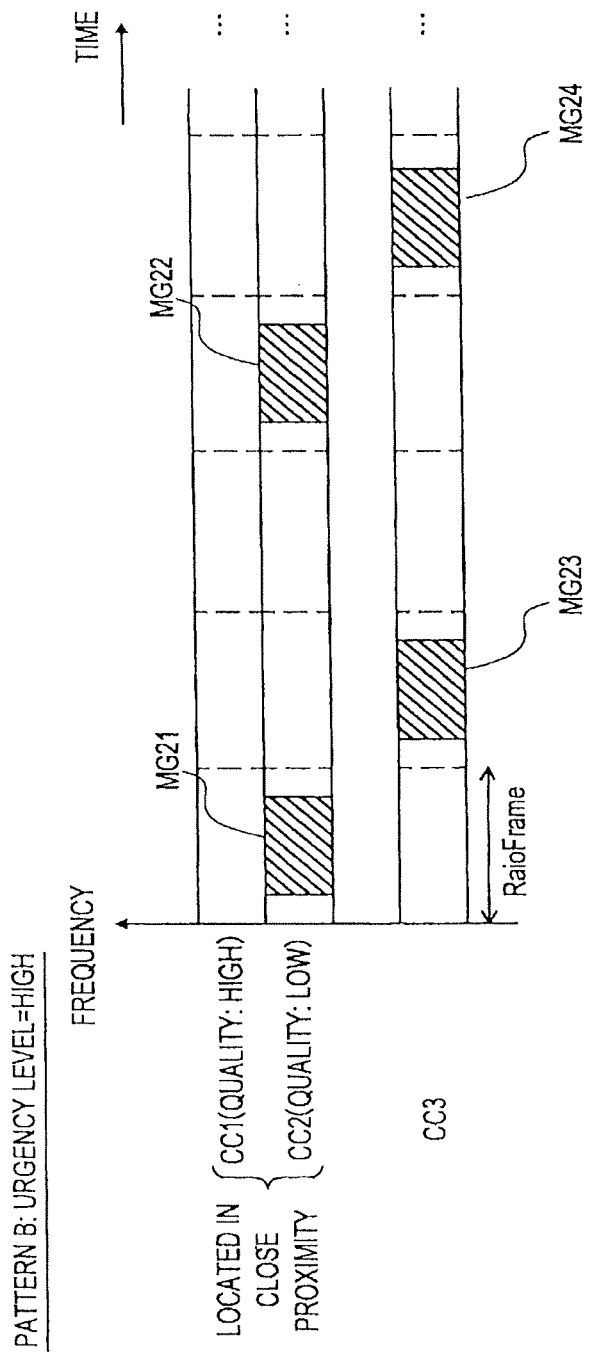
FIG. 11B is an explanatory view to describe a second example of an allocation of measurement gaps.

FIGS. 11A to 11C respectively show examples of the pattern of measurement gaps allocated as a result of the measurement gap allocation process by the control unit 280.

(Pattern A)

Referring to FIG. 11A, one communication channel is made up of three component carriers CC1 to CC3. The component carriers CC1 to CC3 are not located in close proximity to one another in the frequency direction. Further, it is assumed that the urgency level of a handover is determined to be high by the determination unit 270.

In this case, the control unit 280 allocates measurement gaps to all of the component carriers CC1 to CC3. In the example of FIG. 11A, measurement gaps MG11, MG12, . . . are allocated to the component carrier CC1. Further, measurement gaps MG13, MG14, . . . are allocated to the component carrier CC2. Further, measurement gaps MG15, . . . are allocated to the component carrier CC3. Thus, the user equipment performs measurement in a short time, thereby enabling a handover to be executed promptly.

(Pattern B)

Referring to FIG. 11B, one communication channel is made up of three component carriers CC1 to CC3 as in FIG. 11A. The component carriers CC1 and CC2 are located in close proximity to each another in the frequency direction. Further, it is assumed that the urgency level of a handover is determined to be high by the determination unit 270. Further, the quality level of the component carrier CC1 is higher than the quality level of the component carrier CC2.

In this case, the control unit 280 allocates measurement gaps to the component carrier CC2 with the lower quality level, for example, of the component carriers CC1 and CC2 which are located in close proximity to each another in the frequency direction. Further, the control unit 280 allocates measurement gaps also to the component carrier CC3. In the example of FIG. 11B, measurement gaps MG21, MG22, . . . are allocated to the component carrier CC2. Further, measurement gaps MG23, MG24 . . . are allocated to the component carrier CC3. On the other hand, no measurement gap is allocated to the component carrier CC1 that largely contributes to throughput (i.e. with a high quality level). Thus, in the pattern B, a decrease in throughput due to an allocation of measurement gaps is effectively suppressed.

(Pattern C)

Referring to FIG. 11C, one communication channel is made up of three component carriers CC1 to CC3 as in FIGS. 11A and 11B. Further, it is assumed that the urgency level of a handover is determined to be low by the determination unit 270. Further, the quality levels of the component carriers CC1, CC2 and CC3 are low, intermediate and high, respectively.

In this case, the control unit 280 allocates more communication resources for measurement gaps as the quality level of each component carrier is lower. In the example of FIG. 11C, no measurement gap is allocated to the component carrier CC3 with the highest quality level. On the other hand, measurement gaps MG31, MG32, MG33 . . . are allocated to the component carrier CC1. Further, measurement gaps MG34, MG35 . . . are allocated to the component carrier CC2. However, the interval T1 of the measurement gaps in the component carrier CC1 is two radio frames, and the interval T2 of the measurement gaps in the component carrier CC2 is four radio frames. In this manner, the interval of the measurement gaps of the component carrier CC2 with a higher quality level is set longer, so that a decrease in throughput in the communication channel as a whole is effectively suppressed.

Further, in any of the examples of FIGS. 11A to 11C, an allocation of measurement gaps is decided so that the timing of any measurement gap does not coincide with the timing of another measurement gap. This eliminates the existence of a time during which data transmission is not performed at all, so that a delay in data transmission is avoided.

4-3. Alternative Example

Figure 12:
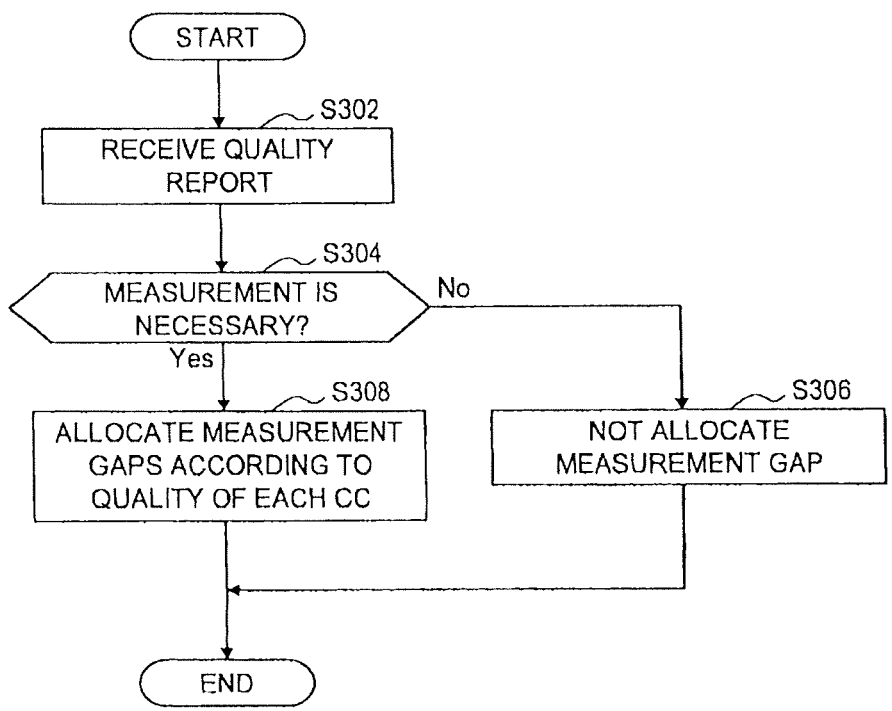
FIG. 12 is a flowchart showing an example of a detailed flow of a measurement gap allocation process according to an alternative example.

In the above embodiment, the case where the base station determines the urgency level of a handover of the user equipment and controls an allocation of measurement gaps according to the urgency level and the quality levels of the respective component carriers is described by way of illustration. However, the base station may control an allocation of measurement gaps according to the quality levels of the respective component carriers without determining the urgency level of a handover of the user equipment. FIG. 12 shows an example of a flow of a measurement gap allocation process according to such an alternative example of the embodiment.

Referring to FIG. 12, a radio communication unit 210 first receives the channel quality report from the user equipment (step S302). Then, the radio communication unit 210 outputs the received channel quality report to the control unit 280.

Next, the control unit 280 determines the necessity of measurement for a handover based on the channel quality report (step S304). When it is determined that measurement for a handover is unnecessary for the reason such as suitable channel quality, for example, measurement gaps are not allocated (step S306), and the measurement gap allocation process ends. On the other hand, when it is determined that measurement for a handover is necessary, the process proceeds to the step S308.

In the step S308, the control unit 280 allocates measurement gaps for each of the component carriers according to the quality levels of the respective component carriers acquired by the quality acquisition unit 272 (step S308). In this step, as described above with reference to FIGS. 11B and 11C, for example, measurement gaps can be preferentially allocated to a component carrier with a low quality level. Further, measurement gaps with a shorter interval can be allocated to a component carrier with a low quality level. The measurement gap allocation process thereby ends.

Note that, in the above measurement gap allocation process or the measurement gap allocation process described earlier with reference to FIG. 10, a constraint on the number of component carriers to which measurement gaps are allocable may be set in advance, for example. For example, the number of component carriers to which measurement gaps are allocable may be always one, and measurement gaps may be allocated to a component carrier with the lowest quality level. Further, when one or a plurality of component carriers (or RF circuits) where measurement is executable is specified in advance, measurement gaps may be allocated to the specified one or plurality of component carriers (or RF circuits).

5. Example of Application to Change or Addition of Component Carrier

The above-described technique related to control of an allocation of measurement gaps is also applicable to a change of a component carrier (a change of the operational frequency of a component carrier) or an addition of a component carrier in the user equipment 100 in the cell of one base station 200.

Figure 13:
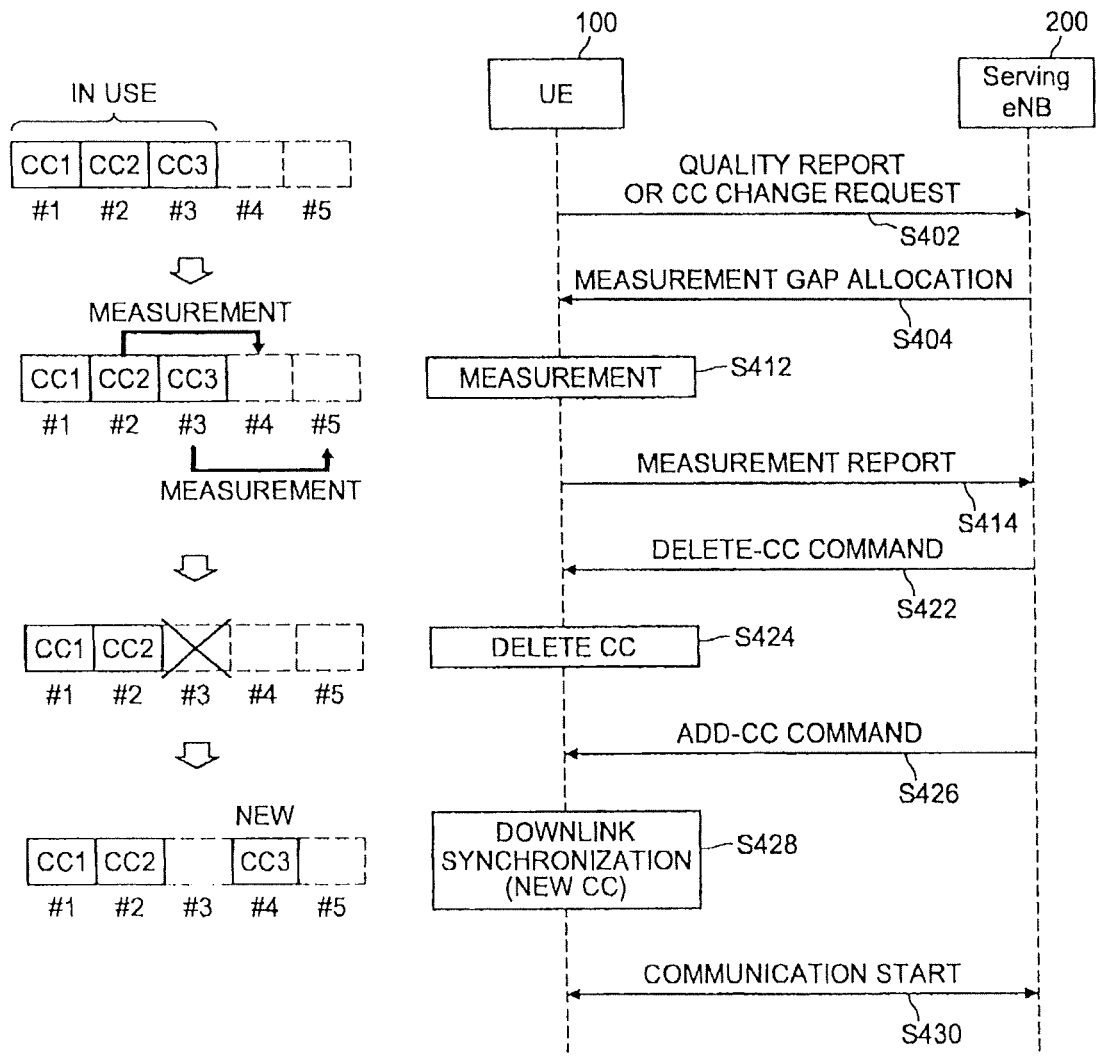
FIG. 13 is an explanatory view to describe a change or an addition of a component carrier.

According to some embodiments, a component carrier used for communication with the mobile terminal is deleted or added from a plurality of component carriers according to at least one of a communication quality and a measurement report. FIG. 13 is an explanatory view to describe an example of applying the above-described embodiment to a change or an addition of a component carrier. Note that it is assumed in the scenario of FIG. 13 that the user equipment 100 performs a radio communication involving the carrier aggregation with the base station 200 acting as a serving base station. A sequence chart about a procedure of changing a component carrier between the user equipment 100 and the base station 200 is shown on the right of FIG. 13. The state of the operational frequency in each stage of the sequence is shown on the left of FIG. 13.

Referring to FIG. 13, the user equipment 100 first performs a radio communication with the base station 200 by using three component carriers CC1 to CC3. The frequency bands in operation of the component carriers CC1, CC2 and CC3 are the first band (#1), the second band (#2) and the third band (#3), respectively, The user equipment 100 first reports the channel qualities of the respective component carriers to the base station 200 (step S402). The channel quality may be reported on a regular basis or when the channel quality falls below a predetermined reference value. Further, instead of the channel quality report, the user equipment 100 may transmit a component carrier change (or addition) request for a throughput increase to the base station 200.

Next, the base station 200 allocates measurement gaps to the user equipment 100 by the measurement gap allocation process which is described earlier with reference to FIG. 10 or 12, for example (step S404).

Specifically, measurement gaps can be preferentially allocated to a component carrier with a low quality level among the component carriers CC1, CC2 and CC3, for example. Further, measurement gaps with a shorter interval can be allocated to a component carrier with a low quality level.

Then, during the periods of the allocated measurement gaps, the user equipment 100 acquires synchronization with a downlink channel from the base station 200 for a frequency band not in use and performs measurement by using a reference signal contained in the downlink channel (step S412). In the example of FIG. 13, measurement for the fourth band (#4) is performed during the period of the measurement gap allocated to the component carrier CC2. Further, measurement for the fifth band (#5) is performed during the period of the measurement gap allocated to the component carrier CC3.

After measurement, the user equipment 100 transmits a measurement report containing measurements to the base station 200 (step S414). The measurements contained in the measurement report may be the average value or the central value of measured values over a plurality of times of measurement or the like.

Receiving the measurement report, the base station 200 determines the necessity of a change or an addition of a component carrier of the user equipment 100 based on the contents of the measurement report. For example, in the case where a frequency band having a higher quality than the channel quality of any of the component carriers CC1 to CC3 exists, it can be decided that the operational frequency of the component carrier should be changed to the frequency band having the higher quality. Further, in the case where the number of component carriers currently used in the user equipment 100 is smaller than the number of available component carriers and another frequency band having a high quality exists, it can be decided that a component carrier whose operational frequency is that of the frequency band having the high quality should be added. In the example of FIG. 13, the base station 200 decides that the operational frequency of the component carrier CC3 should be changed from the third band (#3) to the fourth band (#4).

Accordingly, the base station 200 transmits a component carrier delete command to the user equipment 100 by specifying the component carrier CC3 (step S422). In response thereto, the user equipment 100 deletes the component carrier CC3 from the component carriers in use (step S424). Then, the base station 200 transmits a component carrier add command to the user equipment 100 by specifying the fourth band (#4) (step S426). In response thereto, the user equipment 100 acquires synchronization with a downlink channel of the fourth band (#4) in order to add the new component carrier CC3 whose operational frequency is that of the fourth band (#4) (step S428). Note that because additional timing adjustment is not necessary at the time of changing or adding a component carrier in the cell of the same base station 200, it is not necessary to perform random access unlike the case of a handover.

Through such a procedure, the user equipment 100 continues a radio communication with the base station 200 by using the component carriers CC1 to CC3 whose operational frequencies are those of the first, second and fourth bands, respectively (step S430).

Note that in the case where an addition of a component carrier, rather than a change of a component carrier, is decided, the steps S422 and S424 shown in FIG. 13, for example, can be omitted. Then, in the step S426, for example, an add command of a component carrier whose operational frequency is that of fourth or fifth band is transmitted from the base station 200 to the user equipment 100.

Further, the case where a component carrier is added is when a component carrier not in use (or an RF circuit or the like not in use) remains in the user equipment 100. In such a case, the user equipment 100 may perform measurement by using the component carrier not in use without receiving an allocation of measurement gaps. However, in the case where a component carrier should be added urgently, measurement can be performed at higher speed by using the component carrier in use and the component carrier not in use in parallel. Further, measurement can be performed by using the component carrier in use also in the case where it is not desirable to activate an RF circuit in the sleep mode for the purpose of power saving or the like.

6. Summary

The user equipment 100 and the base station 200 included in the radio communication system 1 according to an embodiment of the present invention are described above with reference to FIGS. 3 to 13. According to the embodiment, in the base station 200, an allocation of measurement gaps is controlled by the control unit 280 with respect to each component carrier according to the urgency level of a handover determined by the determination unit 270. Further, the pattern of an allocation of measurement gaps is controlled according to the quality levels of the respective component carriers. Then, in the user equipment 100, measurement for a handover is performed by using the measurement gaps allocated by the base station 200. It is thereby possible to suppress a decrease in throughput or a delay in handover processing due to an increase in measurement gaps in a radio communication involving the carrier aggregation.

Further, in the embodiment, the pattern of an allocation of measurement gaps can be controlled with respect to each component carrier according to the quality levels of the respective component carriers not only at the time of a handover but also at the time of a change or an addition of a component carrier. It is thereby possible to suppress a decrease in throughput and a delay in processing associated with a change or an addition of a component carrier.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 RADIO COMMUNICATION SYSTEM
100 USER EQUIPMENT
110 RADIO COMMUNICATION UNIT
160 CONTROL UNIT
170 MEASUREMENT UNIT
200 BASE STATION
210 RADIO COMMUNICATION UNIT
270 DETERMINATION UNIT
280 CONTROL UNIT

The invention claimed is:

1. A communication control device comprising:
circuitry configured to:
establish communication with a mobile communication terminal using a plurality of component carriers, and control an allocation of a measurement gap, during which the communication control device does not transmit data to the mobile communication terminal, to each component carrier, wherein the circuitry is further configured to allocate more communication resources to the measurement gaps such that the measurement gaps are allocated to a larger number of component carriers among the plurality of component carriers, as a channel quality of each of the plurality of component carriers lowers, wherein a cycle of an allocation of a first component carrier is longer than a cycle of an allocation of a second component carrier when a channel quality of the first component carrier is higher than a channel quality of the second component carrier.

2. The communication control device according to claim 1, wherein the circuitry is further configured to obtain the channel quality of each of the plurality of component carriers based on a received signal from the mobile communication terminal.

3. The communication control device according to claim 1, wherein the circuitry is further configured to preferentially allocate the measurement gaps to one of the plurality of component carriers with a lower quality.

4. The communication control device according to claim 1, wherein a timing of a measurement gap of a first component carrier is different from a timing of a measurement gap of a second component carrier.

5. The communication control device according to claim 1, wherein
the circuitry is further configured to determine moving speed of the mobile communication terminal, and allocate more communication resources for the measurement gaps as the moving speed of the mobile communication terminal is higher.

6. A mobile communication terminal comprising:
circuitry configured to:
establish a communication with a communication control device using a plurality of component carriers, and
receive, from the communication control device, an allocation of a measurement gap, during which the communication control device does not transmit data to the mobile communication terminal, to each component carrier, wherein the circuitry is further configured to receive, from the communication control device, an allocation of more communication resources to the measurement gaps such that the measurement gaps are allocated to a larger number of component carriers among the plurality of component carriers, as a channel quality of each of the plurality of component carriers lowers, wherein a cycle of an allocation of a first component carrier is longer than a cycle of an allocation of a second component carrier when a channel quality of the first component carrier is higher than a channel quality of the second component carrier.

7. The mobile communication terminal according to claim 6, wherein the circuitry is further configured to receive, from the communication control device measurement gaps preferentially allocated to one of the plurality of component carriers with a lower quality.

8. The mobile communication terminal according to claim 6, wherein a timing of a measurement gap of a first component carrier is different from a timing of a measurement gap of a second component carrier.

9. The mobile communication terminal according to claim 6, wherein the circuitry is further configured to receive, from the communication control device, allocation of more communication resources for the measurement gaps as moving speed of the mobile communication terminal is higher.

10. A method comprising:
establishing communication between a communication control device and a mobile communication terminal using a plurality of component carriers; and controlling an allocation of a measurement gap, during which the communication control device does not transmit data to the mobile communication terminal, to each component carrier, wherein said allocations are such that the measurement gaps are allocated to a larger number of component carriers among the plurality of component carriers, as a channel quality of each of the plurality of component carriers lowers, wherein a cycle of an allocation of a first component carrier is longer than a cycle of an allocation of a second component carrier when a channel quality of the first component carrier is higher than a channel quality of the second component carrier.

11. The method according to claim 10, further comprising:
obtaining the channel quality of each of the plurality of component carriers based on a received signal from the communication terminal.

12. The method according to claim 10, further comprising:
preferentially allocating the measurement gaps to one of the plurality of component carriers with a lower quality.

13. The method according to claim 10, wherein a timing of a measurement gap of a first component carrier is different from a timing of a measurement gap of a second component carrier.

14. The method according to claim 10, further comprising:
determining moving speed of the mobile communication terminal, and allocate more communication resources for the measurement gaps as the moving speed of the mobile communication terminal is higher.

* * * * *